(12) United States Patent
Stever et al.

(10) Patent No.: US 6,350,374 B1
(45) Date of Patent: Feb. 26, 2002

(54) STORMWATER TREATMENT APPARATUS

(75) Inventors: R. Russell Stever, Sparks, NV (US); Ben R. Urbonas, Denver, CO (US); Jonathan E. Jones; Andrew Earles, both of Boulder, CO (US)

(73) Assignee: Jensen Enterprises, Inc., Sparks, NV (US)

( * ) Notice: Subject to any disclaimer, the term of this patent is extended or adjusted under 35 U.S.C. 154(b) by 0 days.

(21) Appl. No.: 09/487,097

(22) Filed: Jan. 19, 2000

(51) Int. Cl.$^7$ ............................................... B01D 43/00
(52) U.S. Cl. ..................... 210/170; 210/521; 210/532.1
(58) Field of Search ................................. 210/747, 170, 210/154, 153, 513, 521, 532.1; 405/39, 40

(56) References Cited

U.S. PATENT DOCUMENTS

| | | | |
|---|---|---|---|
| 255,086 A | 3/1882 | Redmond | |
| 404,852 A | 6/1889 | Long | |
| 1,153,332 A | 9/1915 | Naylor | |
| 1,166,802 A | 1/1916 | Albert et al. | |
| 1,401,182 A | 12/1921 | Overton | |
| 1,644,532 A | 10/1927 | Ledyard et al. | |
| 1,695,217 A | 12/1928 | Thurell | |
| 1,812,401 A | 6/1931 | Goulding | |
| 2,058,044 A | 10/1936 | Spencer | |
| 2,103,600 A | 12/1937 | Stevens | |
| 2,128,569 A | 8/1938 | Velz | |
| 2,279,813 A | 4/1942 | Bent | |
| 2,782,929 A | * 2/1957 | Colket | |
| 2,852,140 A | 9/1958 | MacLaren | |
| 3,510,001 A | 5/1970 | Baer et al. | 210/192 |
| 3,904,524 A | 9/1975 | Pelton et al. | 210/170 |
| 3,938,713 A | 2/1976 | Pielkenrood | 210/534 |
| 3,951,817 A | 4/1976 | Snyder | 210/521 |
| 4,104,164 A | 8/1978 | Chelton | 210/136 |
| 4,127,488 A | 11/1978 | Bell et al. | 210/519 |
| 4,136,010 A | 1/1979 | Pilié et al. | 210/164 |
| 4,250,933 A | 2/1981 | Olson | 222/608 |
| 4,261,823 A | * 4/1981 | Gallagher et al. | 210/164 |
| RE30,793 E | 11/1981 | Dunkers | 210/522 |
| 4,298,471 A | 11/1981 | Dunkers | 210/170 |
| 4,326,952 A | * 4/1982 | Blake | 210/521 |
| 4,328,101 A | 5/1982 | Broden | 210/320 |
| 4,363,731 A | 12/1982 | Filippi | 210/532.1 |
| 4,377,477 A | 3/1983 | Dunkers | 210/170 |
| 4,383,922 A | 5/1983 | Beard | 210/521 |
| 4,400,274 A | * 8/1983 | Protos | 210/302 |
| 4,447,330 A | 5/1984 | Babineaux, III | 210/717 |
| 4,576,511 A | 3/1986 | Vidal, Jr. | 405/37 |
| 4,664,795 A | 5/1987 | Stegall et al. | 210/202 |
| 4,747,962 A | 5/1988 | Smisson | 210/788 |
| 4,865,751 A | 9/1989 | Smisson | 210/788 |

(List continued on next page.)

FOREIGN PATENT DOCUMENTS

| | | |
|---|---|---|
| DE | 41 03 349 A | 6/1992 |
| DE | 92 06 753 U | 12/1992 |
| DE | 44 10 632 A | 9/1995 |
| DE | 195 47 140 | 6/1997 |
| FR | 2 342 943 A | 9/1977 |
| GB | 1 433 171 A | 4/1976 |

*Primary Examiner*—D A Smith
*Assistant Examiner*—Frank M. Lawrence
(74) *Attorney, Agent, or Firm*—Knobbe, Martens, Olson & Bear LLP

(57) ABSTRACT

A liquid purification and separation apparatus for separation of pollutants in stormwater runoff is disclosed. This apparatus utilizes gravitational separation and tortuosity, resulting from a plurality of baffles both perpendicular to and oblique to the primary water flow direction, to trap substances less-dense and more-dense than water. The apparatus features improved resistance to pollutant remobilization through an interactive hydraulic design process resulting in greater pollutant retention.

50 Claims, 8 Drawing Sheets

U.S. PATENT DOCUMENTS

| | | | | |
|---|---|---|---|---|
| 4,886,605 A | * | 12/1989 | Herve | 210/170 |
| 4,892,440 A | | 1/1990 | Regan | 405/36 |
| 4,948,294 A | | 8/1990 | Mercier | 405/37 |
| 4,983,295 A | | 1/1991 | Lamb et al. | 210/521 |
| 4,985,148 A | | 1/1991 | Monteith | 210/519 |
| 4,997,312 A | | 3/1991 | Regan | 405/37 |
| 5,004,534 A | | 4/1991 | Buzzelli | 210/164 |
| 5,080,137 A | | 1/1992 | Adams | 137/810 |
| 5,186,821 A | | 2/1993 | Murphy | 210/86 |
| 5,216,974 A | | 6/1993 | Gordon, Sr. | 210/242.3 |
| 5,223,154 A | | 6/1993 | MacPherson, Jr. et al. | 210/790 |
| 5,228,802 A | | 7/1993 | Kuwabara et al. | 405/41 |
| 5,232,307 A | | 8/1993 | Nouri | 405/36 |
| 5,232,587 A | | 8/1993 | Hegemier et al. | 210/162 |
| 5,249,887 A | | 10/1993 | Phillips | 405/36 |
| 5,266,191 A | * | 11/1993 | Greene et al. | 210/195.1 |
| 5,298,176 A | | 3/1994 | Schloss | 210/803 |
| 5,322,629 A | | 6/1994 | Stewart | 210/767 |
| 5,328,609 A | | 7/1994 | Magnusson et al. | 210/314 |
| 5,342,144 A | | 8/1994 | McCarthy | 405/39 |
| 5,403,474 A | | 4/1995 | Emery | 210/163 |
| 5,437,786 A | | 8/1995 | Horsley et al. | 210/170 |
| 5,480,254 A | | 1/1996 | Autry et al. | 404/2 |
| 5,487,621 A | | 1/1996 | Takada et al. | 405/52 |
| 5,498,331 A | | 3/1996 | Monteith | 210/170 |
| 5,505,860 A | * | 4/1996 | Sager | 210/521 |
| 5,520,825 A | | 5/1996 | Rice | 210/802 |
| 5,536,409 A | | 7/1996 | Dunkers | 210/519 |
| 5,549,817 A | | 8/1996 | Horsley et al. | 210/122 |
| 5,554,301 A | | 9/1996 | Rippetoe et al. | 210/802 |
| 5,605,416 A | | 2/1997 | Roach | 405/21 |
| 5,622,448 A | | 4/1997 | Baum et al. | 405/15 |
| 5,637,233 A | | 6/1997 | Earrusso | 210/767 |
| 5,679,258 A | | 10/1997 | Petersen | 210/703 |
| 5,679,265 A | * | 10/1997 | Van Schie | 210/521 |
| 5,702,593 A | | 12/1997 | Horsley et al. | 210/122 |
| 5,707,527 A | | 1/1998 | Knutson et al. | 210/660 |
| 5,714,069 A | * | 2/1998 | Sager | 210/519 |
| 5,725,760 A | | 3/1998 | Monteith | 210/170 |
| 5,730,878 A | | 3/1998 | Rice | 210/662 |
| 5,744,048 A | | 4/1998 | Stetler | 210/803 |
| 5,753,115 A | | 5/1998 | Monteith | 210/170 |
| 5,759,415 A | | 6/1998 | Adams | 210/776 |
| 5,770,057 A | | 6/1998 | Filion | 210/162 |
| 5,779,888 A | | 7/1998 | Bennett | 210/162 |
| 5,788,848 A | | 8/1998 | Blanche et al. | 210/162 |
| 5,810,510 A | | 9/1998 | Urriola | 405/45 |
| 5,820,751 A | | 10/1998 | Faircloth, Jr. | 210/122 |
| 5,840,180 A | | 11/1998 | Filion | 210/162 |
| 5,890,838 A | | 4/1999 | Moore, Jr. et al. | 405/49 |
| 5,909,982 A | | 6/1999 | Takada et al. | 405/52 |
| 5,972,216 A | | 10/1999 | Acernese et al. | 210/253 |
| 5,985,157 A | | 11/1999 | Lecker et al. | 210/747 |
| 6,120,684 A | * | 9/2000 | Kistner et al. | 210/163 |
| 6,183,633 B1 | * | 2/2001 | Phillips | 210/170 |

* cited by examiner

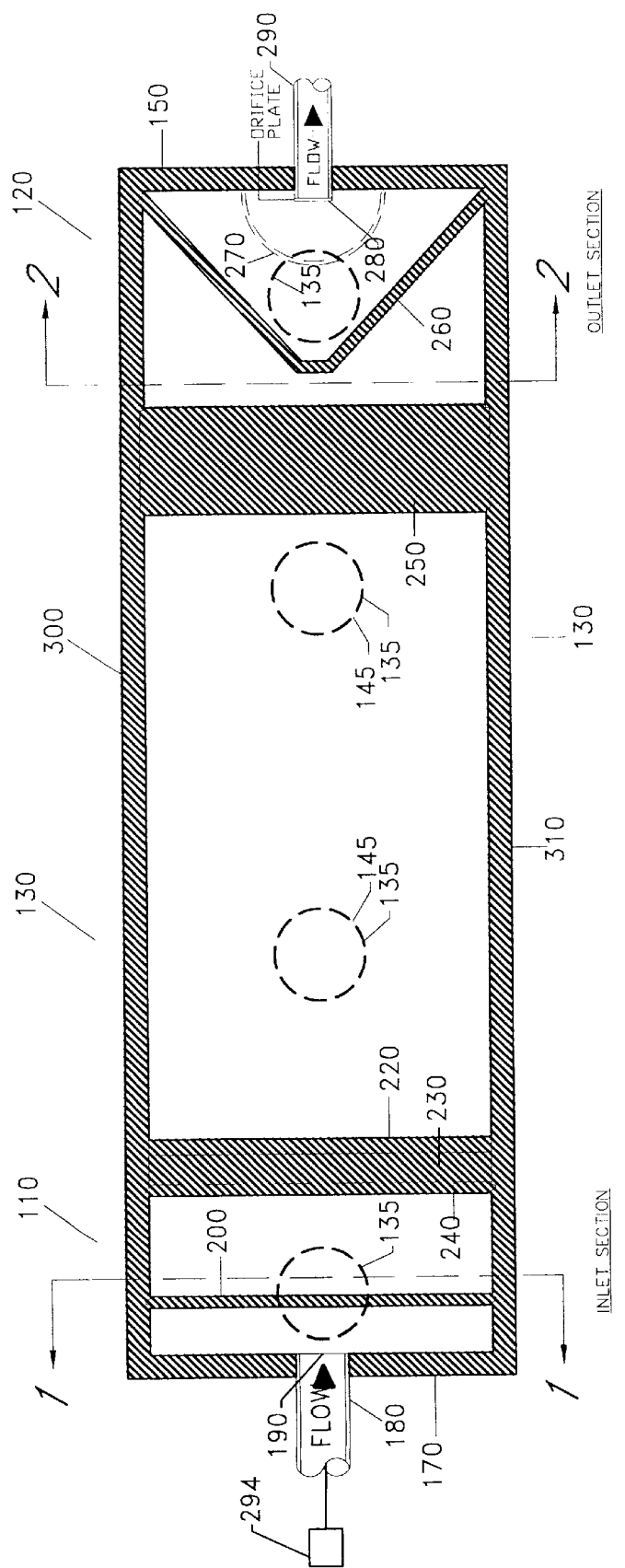
FIG 1: MID-SECTION PLAN VIEW

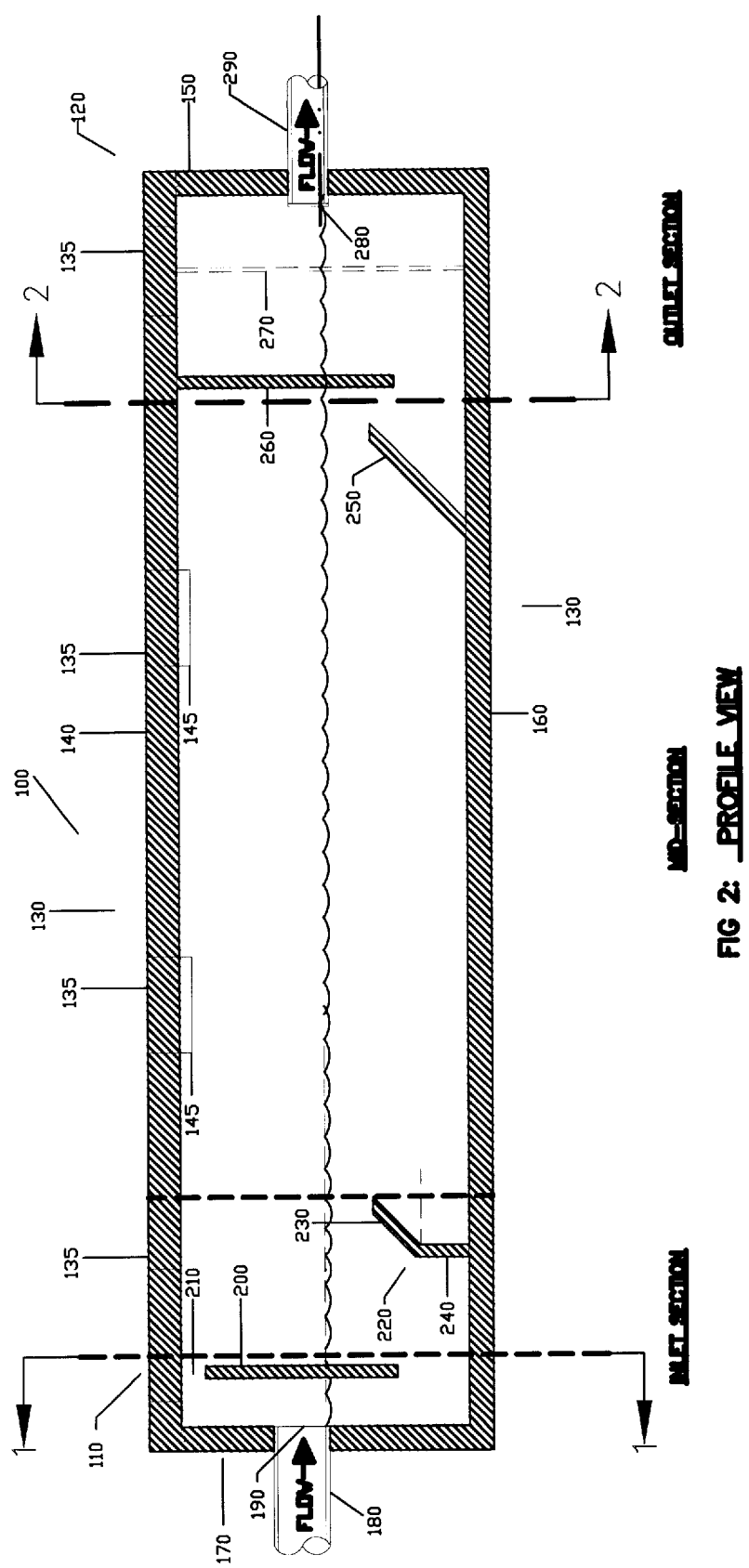

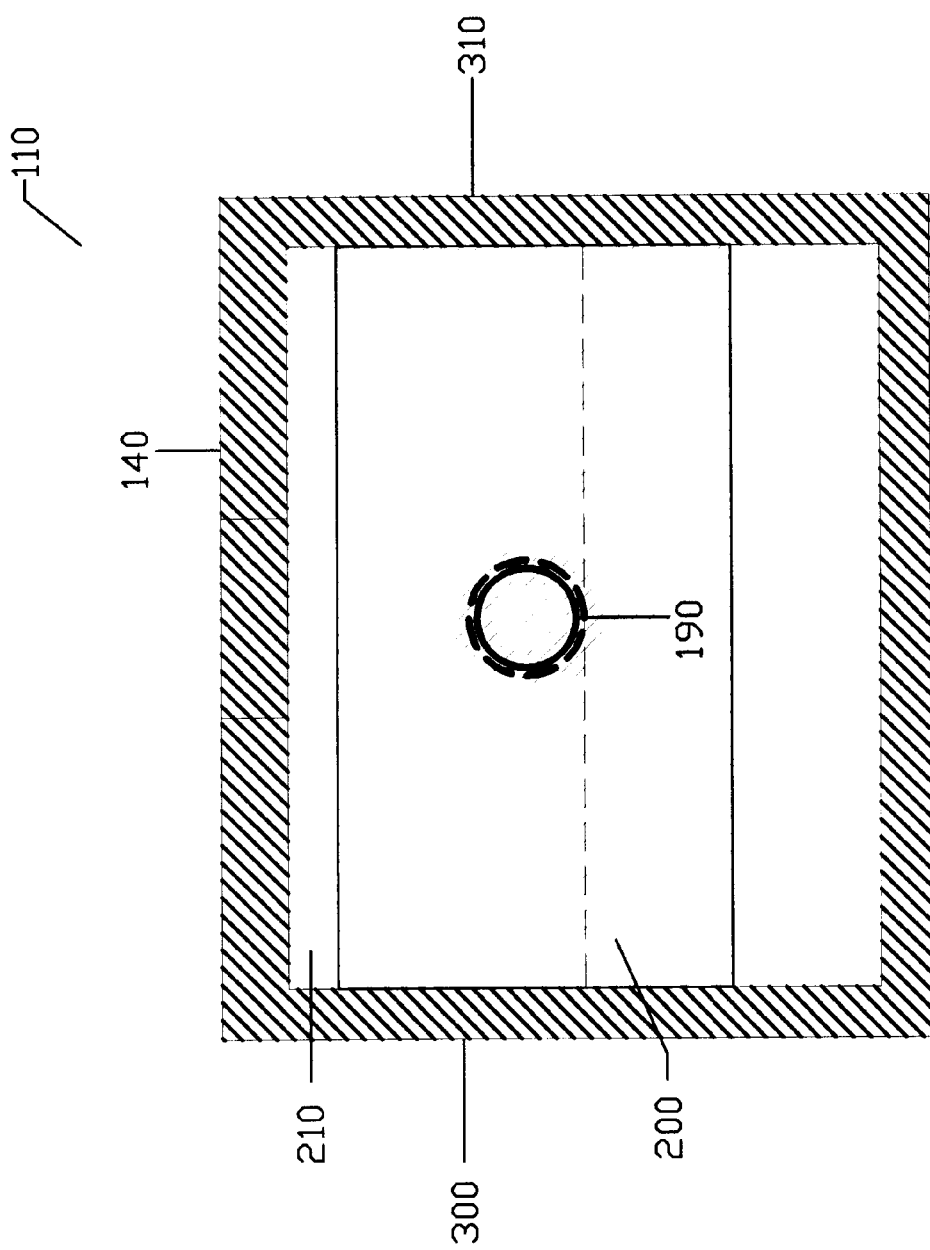
FIG 3: INLET SECTION 1-1

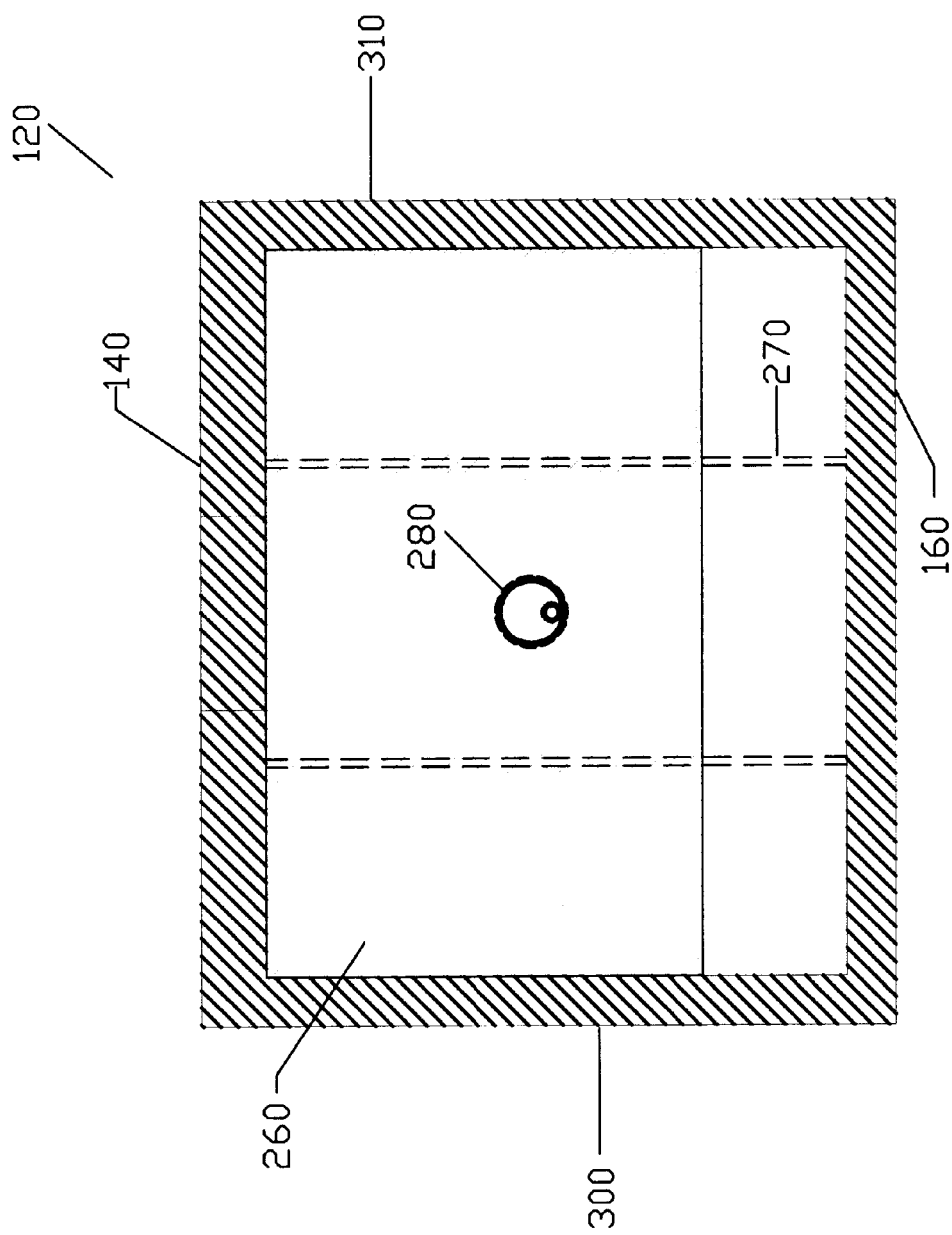
FIG 4: OUTLET SECTION 2-2

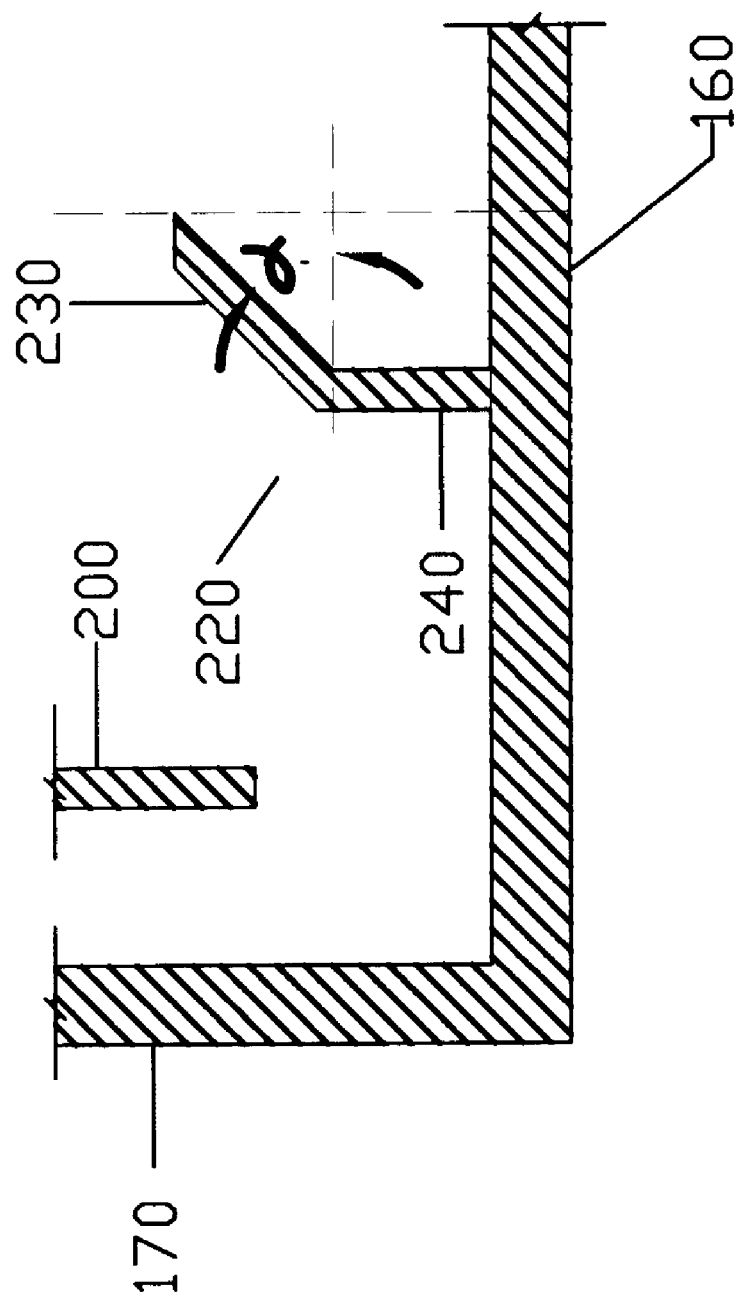
FIG 5: PROFILE VIEW INLET SECTION DETAIL

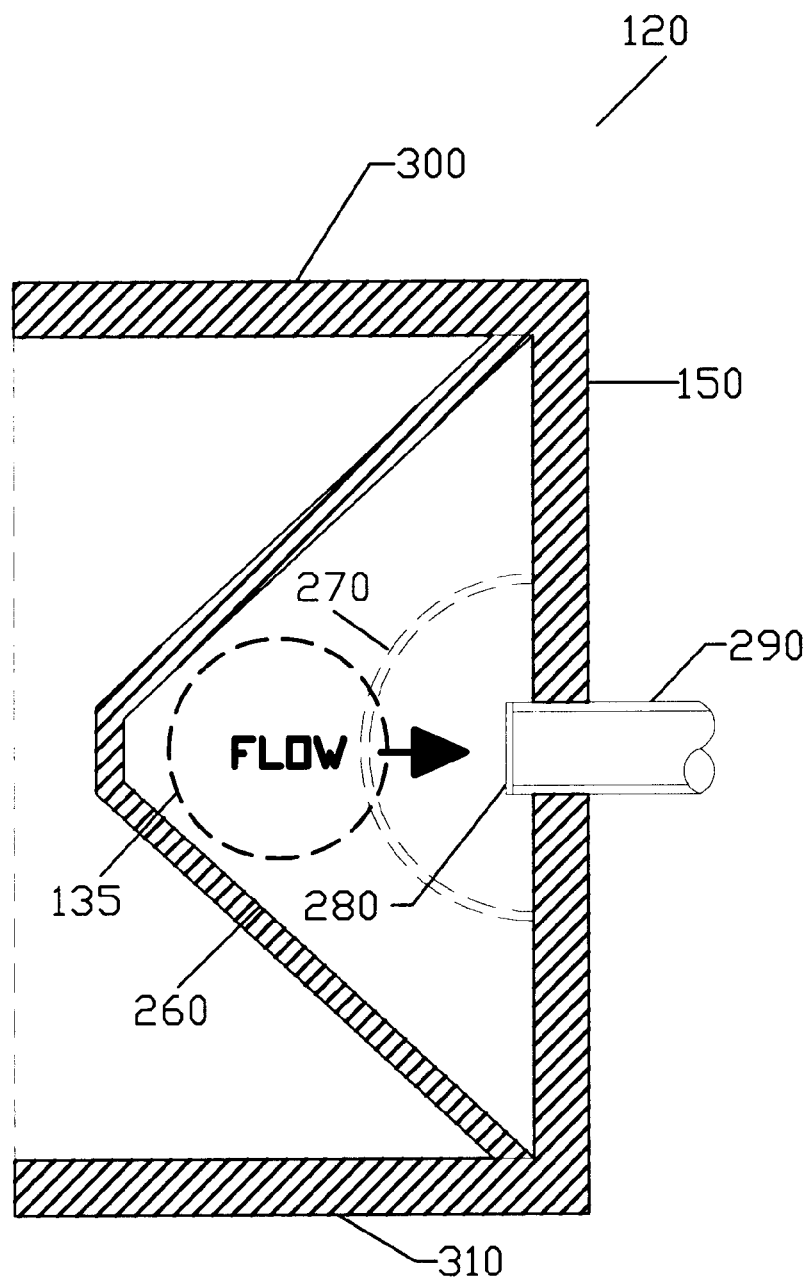
FIG 6: PLAN VIEW OUTLET DETAIL

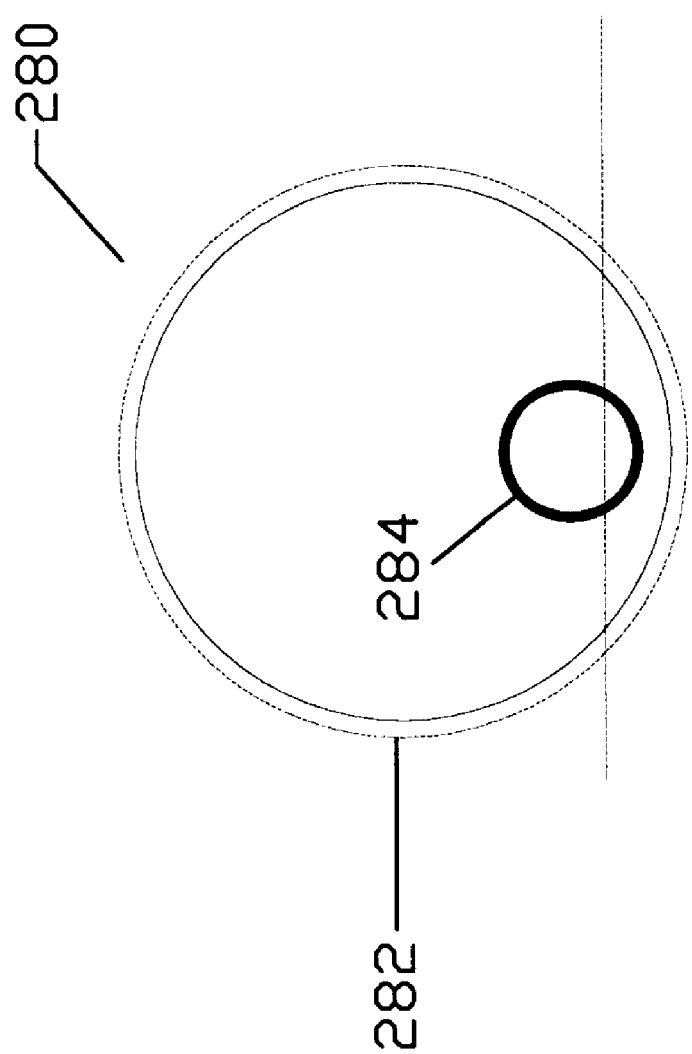
FIG 7: OUTLET ORIFICE DETAIL

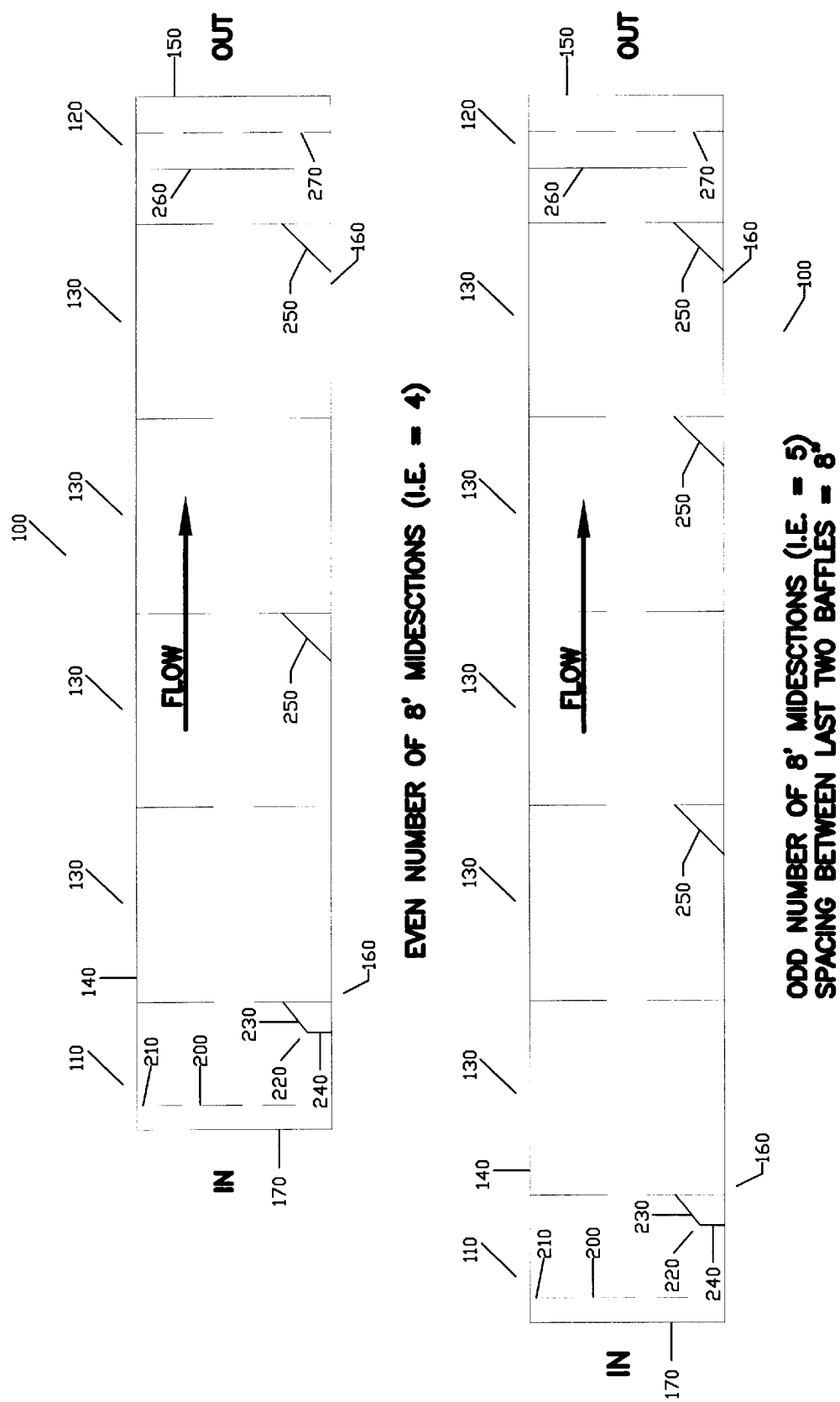
FIG 8: BAFFLE SPACING FOR MULTI-SECTION UNITS

STORMWATER TREATMENT APPARATUS

BACKGROUND OF THE INVENTION

1. Field of the Invention

Apparatus for treatment of stormwater runoff through volume-control-based detention and minimization of pollutant remobilization.

2. Description of the Related Art

This invention relates generally to liquid purification and separation and, more specifically, to an apparatus for separation of pollutants in urban stormwater runoff from the runoff water. This apparatus utilizes gravitational separation and tortuosity, resulting from a plurality of baffles both perpendicular to and oblique to the primary water flow direction, to trap substances less-dense and more-dense than water. This invention is differentiated from prior art by improved resistance to pollutant remobilization, resulting from an iterative experimental hydraulic design process. In addition, this invention provides a degree of retention through volume-control that exceeds that provided by existing gravitational, sub-surface, stormwater treatment systems.

Impacts of stormwater runoff on receiving environments have been documented extensively in engineering and scientific literature. Section 402 of the Federal Clean Water Act (CWA) regulates stormwater discharges through the National Pollutant Discharge Elimination System (NPDES). Treatment of stormnwater runoff using best management practices (BMPs) is a typical requirement of state and local regulations, as well. In the 1990s, there has been growing interest in 'ultra-urban/space limited' BMP's, such as sand filters, water quality inlets, and, reservoir/vault type of structures. Space constraints, high property values, soil conditions, and the proximity of other building foundations often preclude the use of conventional, space-intensive stormwater BMP's such as detention ponds. For in-fill construction or redevelopment in built-up urban areas, where pollutant loads from urban runoff are usually the greatest, unconventional stormwater treatment technologies may be necessary.

Vault-type treatment technologies have been widely used for stormwater treatment in urban areas; however, the effectiveness of these devices for removal of suspended solids and oil and grease has been only marginal. A great weakness of these types of devices has been that large storm events tend to flush out the system, thereby releasing pollutants that were previously removed.

Prior art in the field of this invention of which the applicant is aware includes the following:

U.S. Pat. No. 4,127,488, Bell, J. A. et al., November 1978, Method and apparatus for separating solids from liquids.

U.S. Pat. No. 4,136,010, Pilie, R. J. et al., January 1979, Catch basin interceptor.

U.S. Pat. No. 4,328,101, Broden, C. V., May 1982, Device for separating particulate matter from a fluid.

U.S. Pat. No. 4,363,731, Filippi, R., December 1982, Device for regulating the flow of waste waters.

U.S. Pat. No. 4,383,922, Beard, H. J., May 1983, Waste water clarifier.

U.S. Pat. No. 4,983,295, Lamb, T. J. et al., Jan. 1991, Separator.

U.S. Pat. No. 4,985,148, Monteith, J. G., January 1991, Improved separator tank construction.

U.S. Pat. No. 5,004,534, Buzzelli, V., April 1991, Catch basin.

U.S. Pat. No. 5,186,821, Murphy, D. T., February 1993, Wastewater treatment process with cooperating velocity equalization, aeration, and decanting means.

U.S. Pat. No. 5,342,144, McCarthy, E. J., August 1994, Stormwater control system.

U.S. Pat. No. 5,520,825, Rice, W. M., May 1996, Oil-water separator.

U.S. Pat. No. 5,536,409, Dunkers, K. R., July 1996, Water treatment system.

U.S. Pat. No. 5,637,233, Earrusso, P. J., June 1997, Method and apparatus for separating grease from water.

U.S. Pat. No. 5,679,258, Petersen, R. N., October 1997, Mixed immiscible liquids collection, separation, and disposal method and system.

U.S. Pat. No. 5,759,415, Adams, T., June 1998, Method and apparatus for separating floating and non-floating particulate from rainwater drainage.

U.S. Pat. No. 5,788,848, Blanche, P. et al., August 1998, Apparatus and methods for separating solids from flowing liquids or gases.

U.S. Pat. No. RE30,793, Dunkers, K. R., November 1981, Apparatus for water treatment.

In addition to the patents listed above, a number of inventions in the general field of stormwater treatment methods and devices were discovered during the patent search. The inventions listed below have an element or elements similar to the invention disclosed herein; however, additional elements, details of elements, and/or applications of the inventions differ significantly from the forms and functions of the present invention. While the inventions listed below are intended to provide stormwater treatment, the principle of operation for many of these devices is filtration rather than sedimentation.

U.S. Pat. No. 4,298,471, Dunkers, K. R., November 1981, Apparatus for equalization of overflow water and urban runoff in receiving bodies of water.

U.S. Pat. No. 4,377,477, Dunkers, K. R., March 1983, Apparatus for equalization of overflow water and urban runoff in receiving bodies of water.

U.S. Pat. No. 4,664,795, Stegall, W. A. et al., May 1987, Two-stage waste water treatment system for single family residences and the like.

U.S. Pat. No. 4,747,962, Smissom, B., May 1988, Separation of components of a fluid mixture.

U.S. Pat. No. 4,865,751, Smissom, B., September 1989, Separation of components of a fluid mixture.

U.S. Pat. No. 5,080,137, Adams, T. R., January 1992, Vortex flow regulators for storm sewer catch basins.

U.S. Pat. No. 5,232,587, Hegemier, T. E. et al., August 1993, Stormwater inlet filters.

U.S. Pat. No. 5,322,629, Stewart, W.C., June 1994, Method and apparatus for treating stormwater.

U.S. Pat. No. 5,403,474, Emery, G. R., April 1995, Curb inlet gravel sediment filter.

U.S. Pat. No. 5,437,786, Horsley, S. W. et al., August 1995, Stormwater treatment system/apparatus.

U.S. Pat. No. 5,480,254, Autry, J. L. et al., January 1996, Storm drain box filter and method of use.

U.S. Pat. No. 5,549,817, Horsley, S. W. et al., August 1996, Stormwater treatment system/apparatus.

U.S. Pat. No. 5,702,593, Horsley, S. W. et al., December 1997, Stormwater treatment system/apparatus.

U.S. Pat. No. 5,707,527, Knutson, J. H. et al., January 1998, Apparatus and method for treating stormwater runoff.

U.S. Pat. No. 5,730,878, Rice, T., March 1998, Contaminated waste water treatment method and device.

U.S. Pat. No. 5,744,048, Stetler, C. C., April 1998, Clog resistant storm drain filter.

U.S. Pat. No. 5,770,057, Filion, G., June 1998, Overflow water screening apparatus.

U.S. Pat. No. 5,779,888, Bennett, P. J., July 1998, Filtering apparatus.

U.S. Pat. No. 5,810,510, Urriola, H., September 1998, Underground drainage system.

U.S. Pat. No. 5,840,180, Filion, G., November 1998, Water flow segregating unit with endless screw.

U.S. Pat. No. 5,890,838, Moore, Jr. Et al., April 1999, Stormwater dispensing system having multiple arches.

U.S. Pat. No. 5,972,216, Acemese, P. L. et al., October 1999, Portable multi-functional modular water filtration unit.

U.S. Pat. No. 5,985,157, Leckner, J. P. et al., November 1999, Filter device.

SUMMARY OF THE INVENTION

An aspect of this invention is to provide an apparatus for removal of pollutants with densities greater than and less than water from stormwater runoff.

Another aspect of this invention is to provide an apparatus that retains and immobilizes trapped pollutants, even during periods when flows are high.

Another aspect of this invention is to accumulate pollutants that are less and more dense than water until a time when the apparatus is cleaned out.

Another aspect of this invention is to minimize velocity in the vicinity of the bottom of the apparatus to minimize resuspension of deposited sediments and associated pollutants.

Another aspect of this invention is to provide an apparatus that can provide treatment of stormwater for larger tributary drainage areas by addition of modular sections.

Another aspect of this invention is to collect stormwater runoff and release it at a controlled rate over a specified period of time via an outflow opening.

Other aspects and advantages will become apparent hereinafter.

One aspect of the invention is a rectangular chamber of variable length and height assembled in a modular fashion. The rectangular chamber contains a system of overflow and underflow baffles, both perpendicular to and oblique to the primary direction of flow from the inlet to the chamber to the outlet from the chamber, which are located at opposite ends of the rectangular chamber. The baffles in the chamber serve several purposes including: flow momentum and energy dissipation, creation of a tortuous flow path, retention and immobilization of pollutants less and more dense than water, minimization of resuspension of sediments, and minimization of remobilization of floatable pollutants into the water column. The primary process for pollutant removal is gravitational separation, which occurs while water is detained in the chamber.

A baffle configuration for minimization of resuspension of trapped sediments and associated pollutants was first conceptualized by the inventors and then optimized by iterative experimentation involving three dimensional velocity measurements and dye visualization for a plurality of baffle configurations using a geometrically and hydraulically scaled physical model. Baffle configurations were evaluated for both dynamic (chamber filling and draining) and steady-state (chamber full with inflow rate equal to outflow rate) conditions. This exhaustive experimentation indicates that the baffle configuration of the invention disclosed minimizes resuspension of fine and coarse sediments and associated pollutants to a degree that exceeds the capabilities of prior art. In addition, a trapezoidal underflow baffle, the shape of which was optimized during hydraulic experimentation, impedes material less dense than water from entering the outflow section and exiting the vault. The trapezoidal configuration has the advantage of decreasing the downward velocity of water approaching and then moving under the baffle and into the outlet section and, thereby, decreases the risk of entraining floatable pollutants trapped behind the trapezoidal baffle into the flow passing into the outlet section.

In one aspect, the apparatus has an inlet that delivers water to the chamber from a tributary surface land area, either directly or via storm sewer system piping. Water entering the chamber passes through a system of underflow and overflow baffles both perpendicular to and oblique to the primary direction of flow from the inlet to the outlet, which is located at the end of the rectangular chamber opposite the inflow. As water enters the chamber, the water level in the chamber rises above the permanent pool water surface elevation, which normally is less than or equal to the elevation of the invert of the outflow opening. Outflow from the chamber is controlled by an opening that is sized to provide a specified time for the water in the chamber to drain from the elevation at which the chamber is full to the elevation of the permanent pool. When the rate of inflow is greater than the rate of outflow, the water level in the chamber will rise to the elevation at which the chamber is full. Once the chamber is full, any flow in excess of the outflow rate under full conditions will bypass the chamber via an overflow structure 294. When the rate of outflow is greater than the rate of inflow, the water surface elevation in the chamber will decrease at a rate controlled by the size of the outflow opening and the water surface elevation in the chamber to the elevation of the outflow opening invert, at which time outflow will cease.

Another aspect of the invention is a stormwater treatment apparatus, including a receptacle adapted to receive water flowing from a surface drainage area, the receptacle having a bottom and a top, the receptacle having an inlet and an outlet, the inlet and the outlet being in fluid communication with one another; and at least one baffle positioned within the receptacle between the inlet and the outlet, the baffle extending from the bottom of the receptacle, a first portion of the baffle and the bottom of the receptacle forming an angle therebetween.

A stormwater treatment apparatus varies from other types of treatment apparatus, such as septic tanks, in that stormwater treatment apparatus must capture a wide variety of particles of different sizes and compositions in a pulsed hydraulics environment, as opposed to the more constant flow environment of a septic tank. A stormwater treatment apparatus also differs from septic tanks in that the goal is to permanently trap sediments and other pollutants less or more dense than water, rather than to degrade organic matter and other biodegradable substances and in that a stormwater treatment apparatus is much larger than septic tanks, desirably having a volume of at least 500 cubic feet, more desirably at least 600 cubic feet and, preferably, at least 750 cubic feet.

The apparatus advantageously substantially reduces bottom velocities, thereby greatly reducing resuspension of sediments. In particular, the angle formed between the first portion of the baffle and the bottom of the receptacle is desirably between 30 and 60 degrees, at is desirably inclined in a downstream direction. Further, the height of the baffle is desirably at least two feet to limit the washing out of sediment. To facilitate manufacture and cleaning the baffle desirably includes a second portion, the second portion of the baffle extending from the bottom of the receptacle and forming an angle with the bottom of the receptacle, the angle being roughly 90 degrees.

The apparatus desirably includes an inlet baffle positioned between the inlet and the outlet, the inlet baffle spaced from said bottom and extending between generally opposing walls and an outlet baffle positioned between the inlet and the outlet, the outlet baffle spaced from said bottom and extending between generally opposing walls of the receptacle. The lower end of the outlet baffle is desirably positioned below said outlet. The outlet baffle advantageously may define a horizontal cross-section between a first baffle extending from said bottom and said outlet baffle larger than the horizontal cross-section between said first baffle and a vertical plane tangent to an upstream side of said outlet baffle. This has the effect of reducing the velocity of fluid. In this regard, it is desirable that outlet baffle defines a center section and at least one outer section which extends toward said outlet from said center section. Advantageously, however, the spaces between the outlet baffle and the opposing walls are sufficiently large to permit cleaning and to facilitate manufacture.

Yet another aspect of the invention is an apparatus for cleaning stormwater run-off, the apparatus including a vault having a top, a bottom, two sides, a front and a back, the vault comprising a first baffle extending from the bottom of the vault; a second baffle extending from the bottom of the vault, an inlet section having an opening and an outlet section having an outlet opening.

BRIEF DESCRIPTION OF THE DRAWINGS

One embodiment of this invention, the best mode, is illustrated in the attached drawings, in which like numerals indicate like components throughout the several views. Views include:

FIG. 1—a plan (from a perspective above the apparatus) view of the apparatus that is the subject of this invention;

FIG. 2—a profile (side elevation) view of the apparatus;

FIG. 3—a cross-sectional view of the inlet section of the apparatus (crosssection 1—1 shown on FIG. 1 and FIG. 2);

FIG. 4—a cross-sectional view of the outlet section of the apparatus (crosssection 2—2 shown on FIG. 1 and FIG. 2);

FIG. 5—a detailed (enlarged) profile view of the inlet section baffle configuration;

FIG. 6—a detailed plan view of the outlet section

FIG. 7—a detailed view of the outflow opening configuration;

FIG. 8—an illustration of baffle spacing for this invention for even and odd numbers of chambers for a multi-chambered apparatus (the number of midsections depicted in this view, four for the even illustration and five for the odd illustration, are specific examples of the generalized odd and even baffle spacing rules and are not intended to be restrictive).

DETAILED DESCRIPTION OF THE PREFERRED EMBODIMENT

The drawings illustrate one embodiment of an apparatus 100 for separation of pollutants that are less and more dense than water from stormwater runoff. Referring to FIG.. 1 and FIG. 2, the apparatus 100 consists of a top 140, a bottom 160, an inlet end 170, an outlet end 150, a left side 300, and a right side 310 (left and right are relative to the view from the inlet end 170 to the outlet end 150). These sides define a rectangular chamber with an inlet section 110, an outlet section 120, and one or more midsections 130. The length of the most basic configuration of the apparatus 100 is desirably at most 20-ft, more desirably at most 18-ft 6-in, and, most preferably, 17-ft 6-in (inside dimension); the width of the apparatus is desirably at most 10-ft, more desirably at most 8-ft 6-in, and, most preferably, 7-ft 6-in (inside dimension); the height of the apparatus is 6-ft or 8-ft (inside dimensions). Outside dimensions may vary due to structural strength requirements of the apparatus 100. Desirably, the length of the apparatus 100 increases in 4-ft, 8-ft, or 16-ft increments as additional midsections 130 are employed. The top 140 and bottom 160 are desirably parallel to each other and are separated by a distance of 6-ft or 8-ft (inside dimensions). The left side 300 and right side 310 are desirably parallel to each other and are separated by a distance of at most 10-ft, more desirably at most 8-ft 6-in and, preferably, 7-ft 6-in (inside dimensions). The inlet end 170 and the outlet end 150 are desirably parallel to each other and, for the most basic configuration, are desirably separated by a distance of at most 20-ft and, more desirably, 17-ft 6-in (inner dimension). The distance between the inlet end 170 and the outlet end 150 desirably increases by 4-ft, 8-ft, or 16-ft increments as additional midsections 130 are employed. The thickness of the inlet end wall 170, the outlet end wall 150, the left side 300, the right side 310, and the bottom 160 is desirably at least 3-in and, preferably, 6-in or more. The thickness of these walls may increase or decrease as structural needs of an installation dictate. The thickness of the top 140 of the apparatus 100 is at least 3-in and, desirably, 6-in or more but may increase or decrease as structural needs of an installation dictate.

The ability to increase the size and treatment capacity of the apparatus 100 by addition of modular midsections 130 is advantageous for manufacturing since the apparatus 100 can be manufactured in a wide range of incremental sizes using the same set of forms for precasting. In addition, the modular construction is favorable for applications requiring a large apparatus 100 as the modular sections 110, 120, and 130 can be transported on one or more trucks and then assembled on-site. The incremental sizing may be advantageous for performance at improving water quality as well when the apparatus 100 is sized according to manufacturer's recommendation. For example, if a user, based on sizing calculations, determines that the required capacity of the apparatus 100 necessary to achieve a desired performance is equivalent to the capacity of a midsection with a length of 11-ft, then the user would specify that 2 midsections 130 are needed, one 8-ft long and the other 4-ft long (or two 8-ft long sections), since midsections 130 are discrete components and 1 mid-section 130 would not provide the required capacity. As a result of this modular, incremental sizing, the apparatus 100 specified by the user would always have a capacity equal to or in excess of that required and would, therefore, provide a minimum degree of desired treatment.

A plurality of baffles 220 and 250 are positioned between the inlet end 170 and the outlet end 150. The primary direction of flow is defined as the direction from the inlet end 170 toward the outlet end 150 in the horizontal plane. In the disclosed embodiment, the primary direction of flow is perpendicular to the inlet end 170 and the outlet end 150 and parallel to the top 140, bottom 160, left 300, and right 310 sides. There are two types of overflow baffles employed in this invention. These baffles are referenced as components 220 and 250. Component 220 is a hybrid baffle, and component 250 is an angled baffle. The results of extensive hydraulic testing indicate that the baffle configuration illustrated, as well as the claimed baffle configurations using various combinations of hybrid 220, vertical, and angled 250 baffles, is highly effective at minimizing resuspension of trapped sediments and associated pollutants. Velocity measurements and dye visualization experiments indicate that the apparatus 100 disclosed herein provides a degree of reduction of resuspension that significantly surpasses that of existing art.

Referring to FIG. 1, FIG. 2, and FIG. 5, the hybrid baffle 220 consists of a vertical section 240 that is perpendicular to the primary flow direction and an angled section 230 that is oblique to the primary direction of flow, forming an angle, $\alpha$, with the horizontal plane (angle $\alpha$ is depicted in FIG. 5). Preferably, the vertical baffle section 240 has a length of 1-ft and the angled section of the baffle 230 rises from the top of the vertical section 240 at a 45° angle for a distance of 1-ft in the horizontal plane and a distance of 1-ft in the vertical plane. Preferably, the total vertical rise for a hybrid baffle 220 is 2-ft from the chamber bottom 160, and the horizontal projection is 1-ft 3-in. in the downstream direction (including thickness of the vertical section 240). An angle other than 45° may be used for the hybrid baffle 220 as long as the lengths of components 230 and 240 are adjusted to provide a total rise of 2-ft and the downstream end of component 230 does not extend beyond the dimensions of the top 140, bottom 160, and walls 300, 310, and 170 of the precast unit containing the baffle. Desirably, the angle $\alpha$ is between 0° and 90°, and, more desirably, between 30° and 60° degrees The angled baffle 250 rises 2-ft from the bottom of the chamber 160. An angled baffle 250 is illustrated in FIG. 1 and FIG. 2 in plan and profile views, respectively. For the best mode, the baffle 250 forms an angle, $\alpha$, of 45° with the chamber bottom 160. An angle other than 45° may be used, provided that a vertical rise of 2-ft is maintained and that the downstream end of the angled baffle 250 does not project beyond the end of the associated 8-ft midsection 130. Hybrid baffles 220 and angled baffles 250 may be interchanged to create numerous embodiments; however, the best mode utilizes a single hybrid baffle 220 in the inlet section 110 and angled baffles 250 in midsections 130, the spacing of which is described below. Other shapes and heights of baffles, up to the full depth of the permanent pool have been tested and are viable alternates to the "best design" shown herein and are part of the design claims of this apparatus 100.

Extensive hydraulic experimentation and testing of baffle configurations and types was conducted to determine baffle geometry that effectively reduced velocities in the lower section of the apparatus 100 where sediments accumulate after settling out of the water. Initial testing indicated that angled baffles 250 were more effective than vertical baffles at decreasing bottom velocities in the apparatus' midsections 130. The inventors initially tested angled baffles 250 for the purpose of examining the effect of the angled baffles 250 on flow passing over the crest of the angled baffles 250. In the process of this experimentation, the inventors discovered that the angled baffles 250 had a favorable effect on bottom velocities between two angled baffles 250 separated by a distance of 16-ft or less. A hybrid baffle 220 was developed and tested for the purpose of achieving a reduction in bottom velocities in the midsections 130 comparable to that found using an angled baffle 250, while at the same time decreasing the length in the horizontal plane consumed by the angled baffle 250 by a distance equivalent to the product of the height of the vertical portion of the baffle 240 and the tangent of the angle 90°–$\alpha$. This reduction in the horizontal distance required to accommodate the hybrid baffle 220 allows the inlet section 110 to be shortened, resulting in a reduction in the amount of material necessary to fabricate the inlet section 110. In addition, the vertical portion 240 of the hybrid baffle 220 has the advantage of improved access for a hose or vacuum to clean out the area beneath the baffle 220. An angled baffle 250 permits access beneath the baffle 250 for cleaning only where the distance between the under-surface of the baffle 250 and the bottom of the chamber 160 (inside dimension) is greater than the diameter or height of the intake component of the vacuum or pumping cleaning system. For both angled 250 and hybrid 220 baffles, the experimentation conducted indicated that both types of baffles 250 and 220, performed very well at evenly distributing flow across the width of the apparatus 100.

Water is supplied to the apparatus inlet section 110 via an inlet pipe or other conveyance 180 carrying water from the tributary drainage area to the inlet of the apparatus 190. The invert of the inlet aperture 190 is desirably at least 3-ft above the chamber bottom 160 (inside dimension). The apparatus 100 may also receive water from the tributary drainage area directly rather than via an up-gradient, piped storm sewer system. An example of this configuration would be an apparatus 100 installed to receive water from a manhole chamber below a curb-side drop inlet.

The inlet section 110 consists of several distinct components that are shown in FIG. 1, FIG. 2 in plan and profile views, respectively. FIG. 3 shows a cross-section (1—1) of the inlet section 110, and FIG. 5 shows details of the baffle configuration for the inlet section 110. The dimensions of the inlet section 110 are defined by the inlet end wall 170; the top 140, bottom 160, left 300, and right 310 sides; and a plane perpendicular to the primary direction of flow located a prescribed distance from the inside dimension of the inlet end wall 170 in the downstream direction. This prescribed distance is defined by the length dimension of the precast segment containing the energy dissipation baffle 200 and the most upstream hybrid 220 or angled 250 baffle and, most preferably is 4-ft 9-in. The dimensions of the inlet section 110, exclusive of baffles, desirably are equivalent to the dimensions of the outlet section 120, providing the advantage of having the capability to cast inlet 110 and outlet 120 sections using the same form. The inlet section 110 desirably includes a manhole 135 for access to the inlet section 110 for maintenance. The cover of the manhole 135 is desirably vented to allow exchange of air between the inside of the apparatus 100 and the surface atmosphere to prevent anoxic conditions from developing in the permanent pool. The permanent pool is defined as the volume of water and trapped pollutants in the apparatus 100 above the bottom of the chamber 160 and below the invert of the outflow opening 280.

A component of the inlet section 110 is a flow energy dissipation baffle 200 that is perpendicular to the primary direction of flow. The energy dissipation baffle 200 is parallel to the inlet end wall 170 and is positioned so that the side of the energy dissipation baffle 200 facing the inlet wall 170 is desirably at most 1-ft 6-in and preferably 1-ft from the inner side of the inlet end wall 170 in the primary direction of flow. The energy dissipation baffle 200 desirably is connected to the left side 300 and right side 310 from a distance of desirably at most 2-ft and preferably 1-ft 6-in above the chamber bottom 160 (inside dimension) to a distance of desirably at most 1-ft, and preferably 6-in from the chamber top 140 (inside dimension). The energy dissipation baffle 200 desirably has a thickness of 3-in. The purpose of the flow energy dissipation baffle 200 is to decrease the energy of the incoming flow. For the apparatus 100 described herein, the decrease in flow energy translates to a decrease in the velocity of the incoming water. The space 210 is provided between the top of the energy dissipation baffle 200 and the top 140 of the apparatus 100 for the purpose of allowing overflow for high flows and for the purpose of providing access for maintenance. Hydraulic testing indicates that the energy dissipation baffle 200 is effective at decreasing flow energy. The inventors examined several options for spacing between the inlet end wall 170 and the flow energy dissipation baffle 200 and found that the above-described spacing provided a good balance between the effectiveness of energy dissipation and the space necessary to access the area between the inlet end wall 170 and the baffle 200 for maintenance.

Another element of the inlet section is the inlet overflow baffle 220. The inlet overflow baffle 220 is a hybrid baffle (described above). The inlet overflow baffle 220 desirably is connected to the chamber bottom 160 and the left 300 and right 310 sides of the chamber so that water can only pass over the top of the baffle, defined by component 230. The vertical portion 240 of the inlet overflow baffle 220 desirably is located a distance of at least 2-ft 6-in, more desirably at least 3-ft, and preferably 3-ft 6-in from the inlet end wall 170 (inside dimensions). The thickness of the inlet overflow baffle 220 is desirably 3-in. The vertical rise for the inlet overflow baffle 220 is desirably at most 3-ft, more desirably at most 2-ft 6-in, and, preferably, 2-ft, and the horizontal distance in the direction of flow is desirably at most 2-ft, more desirably at most 1-ft 6-in, and, preferably, 1-ft 3-in (including the baffle thickness of 3-in) for the best mode.

A midsection 130 of the apparatus 100 is defined by a top 140, a bottom 160, a left 300, and a right 310 side that desirably are connected at 90° angles to form an openended rectangular section. FIG. 1 and FIG. 2 depict an apparatus 100 with two, 8-ft midsections 130. The apparatus 100 desirably has at least one midsection 130 but may have additional midsections 130. Desirably, the midsections 130 have a length of 16-ft, more desirably 4-ft, and, preferably, 8-ft. Angled baffles 250 desirably are spaced at 4-ft increments, more desirably at 8-ft increments, and, preferably, at 16-ft increments in midsections 130. For midsections 130 requiring angled baffles 250 to achieve this spacing, an angled baffle 250 (described above) is attached to the bottom of the midsection 130 so that the downstream tip of the angled baffle 250 coincides with the end of the midsection 130. Such an angled baffle 250 in a midsection 130 is shown in FIG. 1 and FIG. 2 in plan and profile views, respectively. While an angled baffle 250 desirably is used in the midsections 130, vertical, hybrid, or other baffle shapes 220 may be used. Since baffle 220 and 250 spacing is preferably 16-ft and midsections 130 are added in 4-ft, 16-ft, or 8-ft increments, not all midsection segments 130 will need baffles 220 and 250. FIG. 8 illustrates baffle 220 and 250 spacing. As FIG. 8 indicates, baffles 220 and 250 preferably are spaced every 16-feet, and a baffle 220 and 250 is desirable at the end of the most downstream midsection 130. Therefore, for an even number of midsections 130, desirably with a length of 8-ft (four as an example in FIG. 8), all overflow baffles 220 and 250 are preferably spaced 16-feet apart. For an odd number of midsections 130, desirably with a length of 8-ft, (five as an example in FIG. 8), however, spacing is preferably 16-feet between all overflow baffles 220 and 250 with the exception of the spacing between the penultimate and ultimate downstream baffles 220 and 250 at the end of the most downstream midsection 130. The number of midsections 130 depicted in FIG. 8 are shown as examples of even and odd numbers of midsections 130 and should not be interpreted as restrictive specifications. Each midsection 130 desirably will have a manhole 135, allowing access through the top of the chamber 140 for maintenance. Desirably, all manholes 135 will be vented to prevent development of anoxic conditions in the permanent pool and will be of sufficient size to allow the contents of the apparatus 100 to be pumped out as a part of regular maintenance. Manholes 135 positioned above midsections of the apparatus 100 desirably will have a collar 145 with approximately the same inner diameter as the manhole that extends into the chamber 3-in below the top 140. The purpose of the collar 145 is to limit the surface area of the water and associated floatable pollutants in the chamber that could potentially be forced out of the apparatus 100 via vents in manhole access areas 135 when the apparatus 100 fills completely.

The midsection 130 components of the apparatus 100 are the primary treatment and pollutant collection chambers. During the time that water is detained in the apparatus 100, sedimentation occurs, resulting in deposition of sediments and associated pollutants with densities greater than water on the bottom 160 of the midsections 130. The configuration of baffling 220 and 250 is such that sediments deposited on the bottom 160 of the midsections 130 resist resuspension during subsequent runoff events. Once the thickness of the sediment layer on the bottom 160 of the midsections 130 increases to a prescribed depth, the apparatus 100 is cleaned via a pump-out or other method to remove the permanent pool and trapped pollutants from the apparatus 100 for disposal.

In addition to sediment removal, the midsections 130 of the apparatus 100 collect and retain materials less dense than water. During the time that water is detained in the apparatus 100, materials that are less dense than water rise toward the water surface. Since flow from the midsections 130 passes to the outlet section 120 by flowing beneath the trapezoidal baffle 260, pollutants on the water surface in the midsections 130 are retained on the upstream side of the trapezoidal baffle 260. Due to the elevation of the invert of the outlet opening 280, the surface of the permanent pool in the apparatus 100 desirably remains at least 1-ft above, and, preferably, 1-ft 5-in above the highest elevation at which water can pass below the trapezoidal underflow baffle 260. As described below, the trapezoidal geometry of the underflow baffle 260 is advantageous for prevention of entrainment of pollutants collected on the surface of the midsections 130 into the flow beneath the trapezoidal baffle 260 entering the outlet section 120. Desirably, a mat or mats composed of material capable of absorbing petroleum-based hydrocarbons with densities less than that of water will be placed in the midsections 130 of the apparatus 100 for the purpose of immobilizing these pollutants. Manholes 135 will be large enough to permit removal of the absorbent mats.

A detailed plan view of the outlet section 120 is shown in FIG. 6, and a detail of the outflow opening configuration 280 is shown in FIG. 7. The dimensions of the outlet section 120 are defined by the outlet end wall 150; the top 140, bottom 160, left 300, and right 310 sides; and a plane perpendicular to the primary direction of flow located 4 ft 9in from the inside dimension of the outlet end wall 150 in the upstream direction. The dimensions of the outlet section 120, exclusive of baffles, are equivalent to the dimensions of the inlet section 110, providing the advantage of having the capability to cast inlet 110 and outlet 120 sections using the same form.

One component of the outlet section 120, is a trapezoidal underflow baffle 260. In the plan view (FIG. 1 and FIG. 6), the trapezoidal underflow baffle 260 desirably consists of a center segment parallel to the outlet end wall 150 and a pair of outer segments. The center segment is located desirably at least 2-ft, more desirably 3-ft, and, preferably 4-ft from the outlet end wall 150 (inside dimension of end wall to upstream side of trapezoidal baffle 260). The center segment of the baffle 260 is centered with respect to the left 300 and right 310 sides of the chamber. Preferably, the length of the center segment 260 is 1-ft and, as a result, the distance between the ends of the center segment of the baffle 260 and each wall 300 and 310 is 3-ft 3-in. In the plan view, the trapezoidal baffle extends from the ends of the center segment to the corners defined by the intersection of the left side wall 300 and the outlet end wall 150 and the right side wall 310 and the outlet end wall 150. In the profile view (FIG. 2), the trapezoidal baffle 260 is located so that the bottom of the baffle 260 desirably is at most 1-ft 11-in and, preferably, 1-ft 6-in above the bottom of the chamber 160 (inside dimension). The baffle 260 extends to the top of the chamber 140 and is joined to the top of the chamber 140 along the trapezoidal-shaped top edge of the baffle 260 displayed in the plan view (FIG. 1 and FIG. 6). The trapezoidal underflow baffle 260 desirably is also attached to the sides of the apparatus 100 where the left and right sides 300 and 310, respectively, form corners with the outlet end 150 from a distance, preferably, 1-ft 6-in above the bottom of the chamber 160 (inside dimension) to the top of the chamber 140.

Initially, the inventors tested a simple, vertical underflow baffle with a thickness of 3-in that was positioned in a plane entirely perpendicular to the outlet end wall 150. This incarnation of the underflow baffle was located a distance of 4-ft from the outlet end wall 150 (inside dimension of end wall to upstream side of underflow baffle) and resulted in an area of 5.625 ft$^2$ between the downstream end of the angled baffle 250 and the upstream side of the underflow baffle in the plan view (see FIG. 1). The inventors investigated the trapezoidal underflow baffle 260 of the present invention for the purpose of decreasing the velocity of the flow passing through the plane between the downstream end of the angled baffle 250 and the upstream side of the underflow baffle 260 in the plan view. The area in the plan view between the downstream end of the angled baffle 250 and the upstream side of the underflow baffle 260 is preferably 18.625ft$^2$. Comparison of the areas between the underflow baffle and the upstream angled baffle 250 for the vertical underflow baffle configuration and the trapezoidal underflow baffle 260 configuration indicates that for equivalent rates of flow passing between the upstream angled baffle 250 and the underflow baffle, the velocity for the vertical baffle configuration preferably would be 3.3 times greater than the velocity for the trapezoidal baffle 260 configuration. The lower velocity attained using the trapezoidal baffle 260 configuration of the present invention is advantageous for protection from entrainment of pollutants residing on the surface layer of the midsections 130 into the flow from the midsection 130 to the outlet section 120. Desirably, the angle between the center segment of the baffle and the outer segments of the baffle is between 90° and 180, more desirably between 120° and 160°, and, preferably 130°.

Another component of the outlet section 120 is outlet screening 270 which is designed to keep trash and/or debris from clogging the outlet opening 280. The outlet screening 270 consists of fine screening or a fine mesh configured as a semi-circle, arch, rectangle, or straight screen in front of the outflow opening 280. The screening is attached to the outlet end wall 150 a horizontal distance in front of the outlet opening that is proportionate to the outlet opening size, but no less than 2 times the diameter of the outlet opening and to the bottom 160 and top 140 of the chamber so that all water passing through the outflow opening 280 will have first passed through the screening 270. The screening 270 will be attached in a manner that will permit removal and cleaning of the screening via an access manhole 135 located in the top of the outlet section 120. The cover for the manhole 135 will be vented to allow exchange of air between the inside of the apparatus 100 and the surface atmosphere to abate development of anoxic conditions in the permanent pool and to relieve air pressure as the apparatus fills and drains with water.

The outflow opening 280, shown in FIG. 1, FIG. 2, and FIG. 4 is the device controlling the release of water from the apparatus 100. A detail of the outflow opening 280 components is shown in FIG. 7. The outlet desirably consists of an 8-in diameter pipe 290, desirably extending from 3-in upstream of the outlet end wall 150 (inside dimension), through the outlet end wall 150. The end of the pipe 290 that is inside the apparatus 100 desirably is covered with an 8-in cap 282. An opening 284 that is sized to provide a predetermined time for the water in the chamber to drain from the elevation at which the apparatus 100 is full to the elevation of the permanent pool is machined into the 8-in cap 282. The opening 284 is manufactured so that the lowest point of the opening is preferably at least ½-in above the lowest point of the 8-in pipe 290 at the end where the cap 282 is attached.

An advantage of creating the outflow opening aperture 284 in a cap 282 that is placed over the end of the outflow pipe 290 that is inside the outlet chamber is that the opening size can be changed as desired during maintenance by replacing the cap 282 with another cap 282 with a different sized opening 284. This flexibility in opening 284 sizing is advantageous for providing an apparatus 100 that can provide an array of treatment levels. The opening 284 size dictates the time that water is detained in the apparatus 100. A smaller opening 284 size would result in detention of water for a longer period of time than that afforded by a larger opening 284 size. The treatment efficiency of an apparatus 100 will increase as the time that water is detained increases. Therefore, the level of treatment can be adjusted by increasing the opening 284 size (decreasing the level of treatment) or decreasing the opening 284 size (increasing the level of treatment). Another advantage of the outflow opening configuration 280, is that the positioning of the opening 284 invert, preferably, a distance of 2-ft 11-in above the bottom 160 and downstream of all baffling 200, 220, 250, and 260 results in release of water with the lowest sediment concentrations through the opening 284. An outflow opening 280 positioned lower than that in the illustrated embodiment would draw more water from the lower part of the outlet section 120, which would contain more suspended sediments. An outflow opening 280 positioned higher than that in the illustrated embodiment would result in a greater permanent pool volume that would need to be pumped out during maintenance.

What is claimed is:

1. A stormwater treatment apparatus, comprising:
   a receptacle having a top, a bottom, a left side wall and a right side wall, an inlet end wall and an outlet end wall, said receptacle comprising an inlet section, an outlet section and a midsection between said inlet section and said outlet section;

an inlet located in said inlet section, spaced above said bottom;

an outlet located in said outlet section spaced above said bottom, said outlet defining a permanent pool water surface elevation level;

a first baffle positioned in front of said inlet, said first baffle extending from above said permanent pool water surface elevation level to below said permanent pool water surface elevation level, but being spaced aboves aid bottom;

a second baffle between said first baffle and said outlet having an upstream side and a downstream side, said second baffle connected to said bottom and extending upward no higher than said permanent pool water surface elevation level, said upstream side of said second baffle including at least a portion angled upward from said bottom and toward said outlet;

a third baffle between said second baffle and said outlet having an upstream side and a downstream side, said third baffle connected to said bottom and extending upward no higher than said permanent pool water surface elevation level, said upstream side of said third baffle including at least a portion angled upward from said bottom and toward said outlet; and a fourth baffle between said third baffle and said outlet, said fourth baffle extending from said top to below said permanent pool water surface elevation level, but being spaced from said bottom.

2. The apparatus of claim 1, wherein said apparatus has a volume of at least 500 cubic feet.

3. The apparatus of claim 1, wherein the angle formed between the first portion of the second baffle and the bottom of the receptacle is between about 30 and 60 degrees.

4. The apparatus of claim 1, wherein the second baffle includes a second portion, the second portion of the baffle extending from the bottom of the receptacle and forming an angle with the bottom of the receptacle, the angle being roughly 90 degrees.

5. The apparatus of claim 4, wherein the angle formed between the first portion and the second portion of the baffle is roughly 135 degrees.

6. The apparatus of claim 1, wherein the fourth baffle defines a horizontal leading edge longer than the horizontal distance between said right side wall and said left side wall along a line tangent to an upstream side of said fourth baffle.

7. The apparatus of claim 1, wherein said fourth baffle further comprises a center section and at least one outer section which extends toward said outlet from said center section.

8. The apparatus of claim 1, wherein the vault includes a plurality of mid-sections, every other mid-section including at least one additional baffle extending from the bottom of the vault.

9. The apparatus of claim 1, wherein both the angle between the receptacle bottom and the first portion of the second baffle and the angle between the bottom and the first portion of the third baffle is approximately 45 degrees.

10. The apparatus of claim 1 where an inlet extends through said inlet end wall.

11. The apparatus of claim 1 where the first baffle is spaced from said top.

12. The apparatus of claim 1 where said additional baffles are regularly spaced at specified distances along the bottom of the midsections.

13. The apparatus of claim 1, where mesh screening from the bottom to the top of the apparatus is attached in a removable fashion to the outlet end wall to form a barrier through which any water that discharges through the opening must pass prior to discharge.

14. The apparatus of claim 1 where access to the inlet section, the outlet section, and all midsections is provided by manholes that are of sufficient size to allow cleaning of the vault via pump out or another vacuum removal process.

15. The apparatus of claim 1 where manholes are provided of sizes are sufficient to allow removal of outlet screening.

16. The apparatus of claim 14 where a collar of a width equivalent to the diameter of the manhole opening extends down from the top of the apparatus for several inches into the apparatus for all manholes associated with midsections.

17. The apparatus of claim 1, wherein the inlet section, outlet section and midsection are separable.

18. The apparatus of claim 1, wherein the inlet section, outlet section and midsection are integral.

19. The apparatus of claim 1, wherein the outlet defines an outlet flow rate and the inlet defines an inlet flow rate.

20. The apparatus of claim 19, where the outlet flow rate is less than the inlet flow rate.

21. The apparatus of claim 20, further comprising an overflow structure upstream to the inlet section.

22. The apparatus of claim 1, where the receptacle is rectangular.

23. The apparatus of claim 1, wherein the angle formed between all baffles between said second baffle and said fourth baffle and the bottom of the receptacle is between about 30 and 60 degrees.

24. The apparatus of claim 1, further comprising an overflow structure upstream to the inlet section.

25. A stormwater treatment apparatus, comprising:

a concrete vault having an inlet section, an outlet section and at least one midsection, said inlet section having a top wall, a bottom wall, a left side wall and a right side wall and an inlet end wall, said outlet section having a top wall, a bottom wall, a left side wall and a right side wall and an outlet end wall, said at least one midsection having a top wall, a bottom wall, a left side wall and a right side wall;

an inlet located in said inlet section, spaced above said bottom wall of said inlet section;

an outlet located in said outlet section spaced above said bottom wall of said outlet section, said outlet defining a permanent pool water surface elevation level;

a first baffle positioned in front of said inlet in said inlet section, said first baffle extending from above said permanent pool water surface elevation level to below said permanent pool water surface elevation level, but being spaced above said bottom wall of said inlet section;

a second baffle between said first baffle and said outlet having an upstream side and a downstream side, said second baffle connected to said bottom wall of said inlet section and extending upward no higher than said permanent pool water surface elevation level, said upstream side of said second baffle including at least a portion angled upward from said bottom wall of said inlet section and toward said outlet;

a third baffle between said second baffle and said outlet having an upstream side and a downstream side, said third baffle connected to said bottom wall of said at least one midsection and extending upward no higher than said permanent pool water surface elevation level, said upstream side of said third baffle including at least a portion angled upward from said bottom wall of said midsection and toward said outlet; and a fourth baffle between said third baffle and said outlet, said fourth baffle extending from above said permanent pool water surface elevation level to below said permanent pool water surface elevation level, but being spaced from said bottom wall of said outlet section.

26. The apparatus of claim 25, wherein said apparatus has a volume of at least 500 cubic feet.

27. The apparatus of claim 25, wherein the angle formed between the first portion of the second baffle and the bottom of the vault is between about 30 and 60 degrees.

28. The apparatus of claim 25, wherein the second baffle includes a second portion, the second portion of the baffle extending from the bottom of the vault and forming an angle with the bottom of the vault, the angle being roughly 90 degrees.

29. The apparatus of claim 28, wherein the angle formed between the first portion and the second portion of the baffle is roughly 135 degrees.

30. The apparatus of claim 25, wherein the fourth baffle defines a horizontal leading edge longer than the horizontal distance between said right side wall and said left side wall along a line tangent to an upstream side of said fourth baffle.

31. The apparatus of claim 25, wherein said fourth baffle further comprises a center section and at least one outer section which extends toward said outlet from said center section.

32. The apparatus of claim 25, wherein the vault includes a plurality of mid-sections, every other mid-section including at least one additional baffle extending from the bottom of the vault.

33. The apparatus of claim 25, wherein both the angle between the vault bottom and the first portion of the second baffle and the angle between the bottom and the first portion of the third baffle is approximately 45 degrees.

34. The apparatus of claim 25 where an inlet extends through said inlet end wall.

35. The apparatus of claim 25 where the first baffle is spaced from said top.

36. The apparatus of claim 25 further comprising additional baffles regularly spaced at specified distances along the bottom of the midsections.

37. The apparatus of claim 25 where mesh screening from the bottom to the top of the apparatus is attached in a removable fashion to the outlet end wall to form a barrier through which any water that discharges through the opening must pass prior to discharge.

38. The apparatus of claim 25 where access to the inlet section, the outlet section, and all midsections is provided by manholes that are of sufficient size to allow cleaning of the vault via pump out or another vacuum removal process.

39. The apparatus of claim 25 where manholes are provided of sizes are sufficient to allow removal of outlet screening.

40. The apparatus of claim 38 where a collar of a width equivalent to the diameter of the manhole opening extends down from the top of the apparatus for several inches into the apparatus for all manholes associated with midsections.

41. The apparatus of claim 25, wherein the inlet section, outlet section and midsection are separable.

42. The apparatus of claim 25, wherein the inlet section, outlet section and midsection are integral.

43. The apparatus of claim 25, wherein the outlet defines an outlet flow rate and the inlet defines an inlet flow rate.

44. The apparatus of claim 43, where the outlet flow rate is less than the inlet flow rate.

45. The apparatus of claim 44, further comprising an overflow structure upstream to the inlet section.

46. The apparatus of claim 25, where the vault is rectangular.

47. The apparatus of claim 25, wherein the angle formed between all baffles between said second baffle and said fourth baffle and the bottom of the vault is between about 30 and 60 degrees.

48. The apparatus of claim 25, further comprising an overflow structure upstream to the inlet section.

49. An apparatus for separation of pollutants in runoff that are less and more dense than the runoff water, comprising:

a receptacle adapted to receive stormwater runoff flowing from all surface areas tributary to it, the receptacle having a bottom and a top, a left side-wall and right side-wall, and a front side-wall and end side-wall, forming a rectangular tank;

an inlet for introducing stormwater flowing from tributary surface areas into the receptacle and an outlet for discharging water;

at least four baffles positioned within the receptacle between the inlet and the outlet, with all of the baffles attached to both sides of the receptacle, with at least to baffles attached to the bottom of the receptacle and not attached to the top, at least one baffle attached to the top of the receptacle and not attached to the bottom, and at least one baffle that is not attached to the bottom and top of the receptacle;

an inlet section for receiving water, for decreasing energy of the flowing water, and for uniformly distributing water across the width of the receptacle;

one or more midsections for trapping materials more dense than water that settle out of water by gravity and for trapping materials less dense than water that rise to the surface of water by gravitational separation;

an outlet section for discharging water at a controlled rate and for excluding materials more and less dense than water being discharged;

where the outlet section includes an opening located on the end side-wall that allows water in the apparatus to discharge, where mesh screening from the bottom to the top of the apparatus is attached in a removable fashion to the end side-wall to form a half cylinder through which any water that discharges through the opening must pass prior to discharge.

50. An apparatus for separation of pollutants in runoff that are less and more dense than the runoff water, comprising:

a receptacle adapted to receive stormwater runoff flowing from all surface areas tributary to it, the receptacle having a bottom and a top, a left side-wall and right side-wall, and a front side-wall and end side-wall, forming a rectangular tank;

an inlet for introducing stormwater flowing from tributary surface areas into the receptacle and an outlet for discharging water;

at least four baffles positioned within the receptacle between the inlet and the outlet, with all of the baffles attached to both sides of the receptacle, with at least two baffles attached to the bottom of the receptacle and not attached to the top, at least one baffle attached to the top of the receptacle and not attached to the bottom, and at least one baffle that is not attached to the bottom and top of the receptacle;

an inlet section for receiving water, for decreasing energy of the flowing water, and for uniformly distributing water across the width of the receptacle;

one or more midsections for trapping materials more dense than water that settle out of water by gravity and for trapping materials less dense than water that rise to the surface of water by gravitational separation;

an outlet section for discharging water at a controlled rate and for excluding materials more and less dense than water being discharged;

where the water surface level in the apparatus is controlled by the outflow opening invert elevation;

where the opening is an aperture machined into a cap that is sized to fit exactly around the circumference of an outflow pipe that protrudes a short distance into the outlet section;

where access to the inlet section, the outlet section, and all midsections is provided by manholes that are of sufficient size to allow cleaning of the vault via pump out or another vacuum removal process;

where a short, hollow cylinder of a diameter equivalent to the diameter of the manhole opening extends down from the top of the apparatus for several inches into the apparatus for all manholes associated with midsections.

* * * * *